(12) United States Patent
Reiter

(10) Patent No.: US 8,535,129 B2
(45) Date of Patent: Sep. 17, 2013

(54) STRAW WALKER FOR A COMBINE HARVESTER

(75) Inventor: Franz Reiter, Waldzell (AT)

(73) Assignee: Wintersteiger AG, Ried im Innkreis (AT)

( * ) Notice: Subject to any disclaimer, the term of this patent is extended or adjusted under 35 U.S.C. 154(b) by 0 days.

(21) Appl. No.: 13/478,395

(22) Filed: May 23, 2012

(65) Prior Publication Data

US 2012/0309476 A1    Dec. 6, 2012

(30) Foreign Application Priority Data

Jun. 1, 2011 (AT) .................................. A 809/2011

(51) Int. Cl.
*A01F 12/30* (2006.01)

(52) U.S. Cl.
USPC ................................................ 460/85

(58) Field of Classification Search
USPC .................. 460/85, 101, 102; 209/261, 313, 209/314
See application file for complete search history.

(56) References Cited

U.S. PATENT DOCUMENTS

| 2,642,993 | A | * | 6/1953 | Straley ........................... 209/398 |
| 5,176,574 | A | * | 1/1993 | Matousek et al. ............ 460/100 |
| 5,462,174 | A | * | 10/1995 | Truckenbrod et al. ........ 209/394 |
| 5,487,703 | A |   | 1/1996 | Kuchar |
| 5,582,545 | A |   | 12/1996 | Grove |
| 6,379,243 | B1 | * | 4/2002 | Schumacher et al. ........ 460/101 |
| 7,566,266 | B1 | * | 7/2009 | Ricketts et al. ............... 460/101 |
| 7,997,967 | B2 | * | 8/2011 | Ricketts et al. ............... 460/101 |

* cited by examiner

*Primary Examiner* — Alicia Torres
(74) *Attorney, Agent, or Firm* — Collard & Roe, P.C.

(57) ABSTRACT

A straw walker for a combine harvester includes a straw walker grate provided with through-openings for grain to be separated and with driving profiles arranged along the straw walker grate at a mutual distance from one another. The driving profiles extend transversely to the conveying direction and include a first respective profile limb upwardly protruding from the straw walker grate. In order to provide advantageous conveying conditions, the driving profiles also include a second respective profile limb descends in the conveying direction towards the straw walkers grate. The second respective profile limb is provided between the first respective profile limb and the straw walker grate on the breast side of the driving profiles. The breast side of the driving profiles is at the rear of the driving profiles in the conveying direction.

6 Claims, 3 Drawing Sheets

STRAW WALKER FOR A COMBINE HARVESTER

CROSS REFERENCE TO RELATED APPLICATIONS

Applicant claims priority under 35 U.S.C. §119 of Austrian Application No. A 809/2011 filed on Jun. 1, 2011, the disclosure of which is incorporated by reference.

The invention relates to a straw walker for a combine harvester, comprising a straw walker grate provided with through-openings for the grain to be separated and with driving profiles which are arranged along the straw walker grate at a mutual distance from one another, which extend transversely to the conveying direction and which comprise a profile limb protruding from the straw walker grate.

It is common practice in combine harvesters for separating grain from the threshing material to use a straw walker adjacent to the threshing drum, which straw walker comprises straw walker racks provided with fall stages with a straw walker grate which is provided between toothed sidewalls, rises between the fall stages in the conveying direction, and is provided with mostly elongated through-openings for the grain to be separated. The straw walker racks are driven by means of crankshafts, with the mutually phase-offset circular oscillations of the straw walker grates of the individual racks ensuring the conveyance of the material under simultaneous loosening of the threshing material with the consequence that the grain detaching from the remaining threshing material will fall through the through-openings of the straw walker grates while the remaining threshing material will be further conveyed by the straw walker racks. It has been noticed however that the known straw walkers, despite the driving profiles usually ascending in the conveying direction and extending transversely to the conveying direction, will only work satisfactorily when a continuous flow of material can be expected, which is no longer given for example when the straw walker runs empty.

For cultivation purposes, combine harvesters are used which thresh the material to be harvested in parcels, wherein it is necessary to prevent mixture of the grains of different parcels by allowing the straw walker to run completely empty. As a result of the inadequate conveyance of the threshing material during empty running, comparatively long runtimes are required for the complete emptying of the straw walkers, leading to respective standstill periods of the combine harvester.

The invention is therefore based on the object of providing a straw walker of the kind mentioned above in such a way that the conveyance of the threshing material can be improved considerably even in the case of inconsistent supply thereof in order to relevantly reduce the idle running periods until the complete emptying of the straw walker racks.

This object is achieved by the invention such a way that a profile limb descending towards the straw walkers grate in the conveying direction is provided between the profile limb upwardly protruding from the straw walker grate and the straw walker grate on the breast side of the driving profiles which is at the front in the conveying direction.

As a result of the profile limbs descending in the conveying direction against the straw walker grate on the front breast side of the driving profiles, conveying areas are created in conjunction with the circular oscillation of the straw walker racks, which conveying areas are aligned transversely to the conveying direction and support an ejection acceleration of the threshing material with the effect that the gripped threshing material is conveyed from one of the straw walker chambers respectively resulting between the driving profiles into the chamber following in the conveying direction, which occurs independently from any conveying pressure caused by resupplied straw. Moreover, a circular movement of the threshing material is obtained within the individual straw walker chambers, which on the one hand leads to a loosening of the threshing material and therefore to a better separation rate for the grain, and the other hand entails a cleaning effect for the chambers which are cleaned automatically from impurities which would attach otherwise. An additional factor is that short straw will align transversely to the conveying direction on these profile limbs extending transversely to the conveying direction and descending in the conveying direction against the straw walker grate, and therefore has a lower tendency to be removed through the lead-through openings of the straw walker grates, thus easing the burden on the following cleaning screens for the separated grain.

In order to also achieve advantageous conveying conditions for straw with longer stalks, the driving profiles may comprise in a group-wise alternating manner a sharp-edged profiled longitudinal edge and a longitudinal edge provided with protruding aligning teeth of the profile limbs protruding from the straw walker grate. The longer straw stalks which come to lie between the aligning teeth of the one driving profiles are guided by said aligning teeth along the length in the conveying direction, whereas the sharp-edged profiled longitudinal edges ensure improved entrainment of said stalks. Furthermore, the detachment of grain still partly attached to the straw can be supported by the sharp-edged profiling of the longitudinal edges of a group of driving profiles because husks or detached ears can be torn open with the blade-like edges. Especially advantageous conditions are obtained in this connection when a driving profile with a sharp-edged profiled longitudinal edge of the profile limb protruding from the straw walker grate is arranged between two groups of three respective driving profiles provided with aligning teeth because it has been noticed in this case that the portions of straw with long stalks are guided substantially along their length over the entire conveying path between the aligning teeth during the conveyance over and beyond the individual straw walker chambers.

In order to ensure that existing straw walkers can be reconfigured in a simple manner, the driving profiles can be arranged as supplementary profiles in addition to the conventional conveying ribs of the straw walker grate, so that the existing conveying ribs merely need to be connected with the supplementary profiles. These supplementary profiles allow an adjustment of the straw walker to the respective threshing material in order to achieve especially good separation rates. The different masses of the various seeds can be taken into account by inclination and dimensions of the profile sections of the driving profiles.

For the purpose of simply exchanging the supplementary profiles, the driving profiles may comprise a plug-in receptacle for the conveying ribs, in which the driving profiles merely need to be inserted in this case. Especially simple constructional conditions can be achieved in this connection in such a way that the profile limbs of the driving profiles which descend towards the straw walker grate comprise fingers which protrude against the conveying ribs in the manner of a comb and which engage into the elongated through-openings of the straw walker grate, because in this case an additional support for the driving profiles placed on the conveying ribs is achieved within the elongated holes of the straw walker grate and stiffening of the straw walker grate in this region is achieved at the same time.

The subject matter of the invention is shown in the drawings by way of example, wherein.

Figure 1:
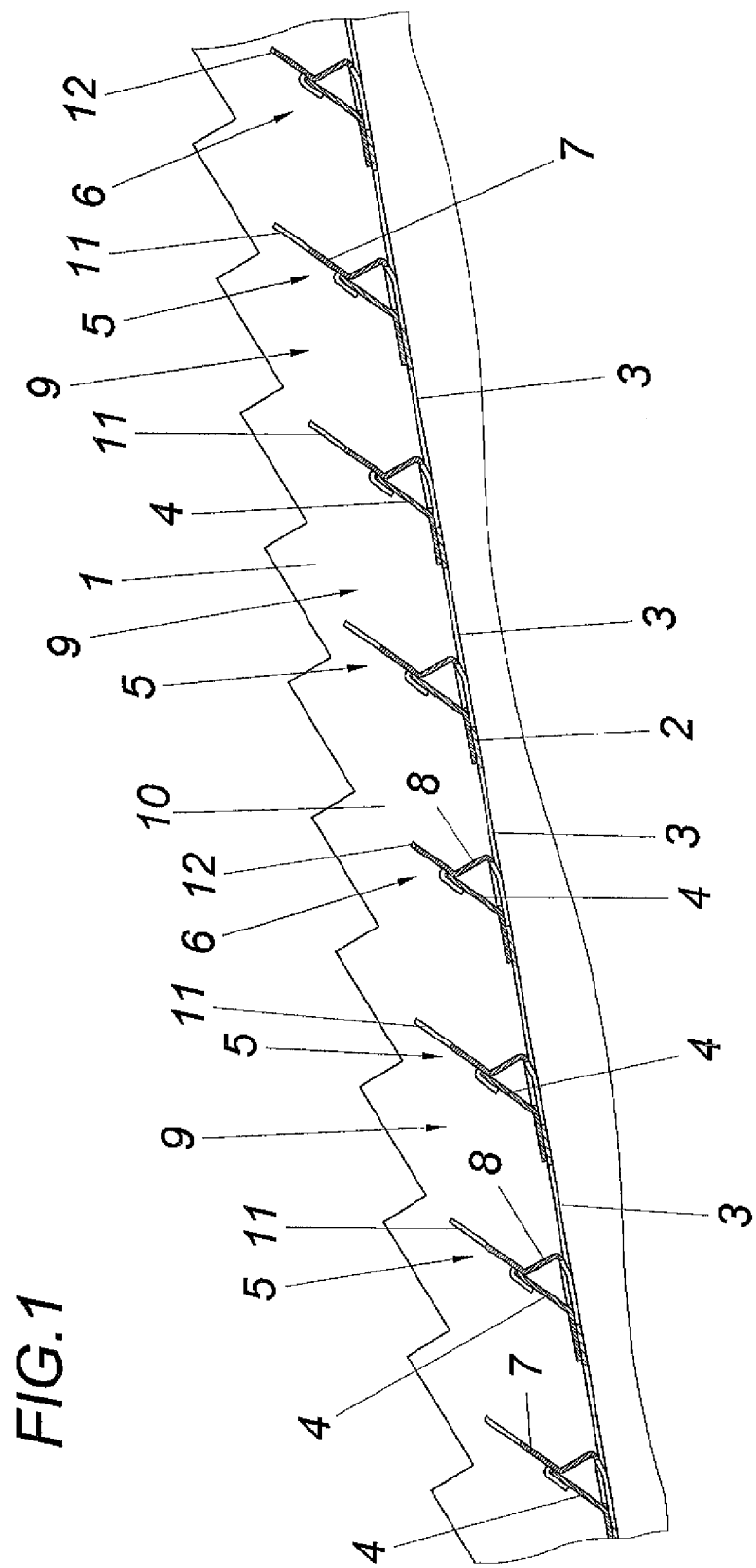
FIG. 1 shows a sectional view of a straw walker in accordance with the invention in a simplified longitudinal section.

In connection with a straw walker for a combine harvester which is usually composed of several straw walker racks, the drawing shows a straw walker rack with a straw walker grate 2 which is provided between two toothed side walls 1 and which is provided with elongated through-openings 3 for the grain to be separated. Said straw walker grate 2 is provided in the conventional manner with conveying ribs 4 which extend transversely to the conveying direction, protrude upwardly from the straw walker grate 2 and generally ascend in the conveying direction. Since the conveying ribs 4 are insufficient to empty the straw walker within a short period of time when the conveying pressure by the following straw is missing, the existing conveying ribs 4 are additionally provided with driving profiles 5 and 6. It is understood that the straw walker grates 2 could also be arranged without separate conveying ribs 4 with respective driving profiles 5 and 6.

As a result of these driving profiles 5 and 6, the conveying ribs 4 are extended by a profile limb 7 which ascends in the conveying direction and which is adjacent on the breast side of the driving profiles 5 and 6 at the front in the conveying direction to a profile limb 8 which descends in the conveying direction against the straw walker grate 2. The profile limb 7 can also protrude upwardly from the straw walker grate 2 in special cases without any ascent in the conveying direction, e.g. during the threshing of corn which has grain of a comparatively large mass.

The profile limb 8 which descends towards the straw walker grate 2 supports a revolving motion for the threshed material as a result of the phase-offset crankshaft drive of the individual straw walker racks in co-operation with the profile limb 7 ascending in the conveying direction within the chambers 9 obtained between successive driving profiles 5, 6. Said improved revolving motion in the direction of the arrow 10 improves loosening the threshed material on the one hand and therefore the separation of the grain through the through-openings 3 of the straw walker grate 2, and causes an alignment of the short straw transversely to the conveying direction on the other hand, so that only a comparatively small amount of the short straw together with the grains will reach the following cleaning screens through the through-openings 3 of the straw walker grate 2, which cleaning screens are therefore burdened to a lesser extent.

The revolving motion of the threshing material within the individual straw walker chambers 9 also leads to an improved conveying performance because the profile limbs 8, which as a result of their inclination descending towards the straw walker grate 2 are aligned substantially transversely to the conveying section of the revolving motion of the straw walker racks, are capable of sufficiently accelerating the threshing material in order to reach the following straw walker chamber 9 via the driving profile 5 and 6 which follows next in the conveying direction.

The driving profiles 5, 6 are arranged differently in groups, so that especially the longitudinal conveyance of the longer straw stalks can be taken into account. While the profile limbs 7 of the driving profiles 5 which ascend in the conveying direction are provided with protruding aligning teeth 11, the profile limbs 7 of the driving profiles 6 have a sharp-edged profiled longitudinal edge 12. As is shown in FIG. 1, one group of driving profiles 5 with aligning teeth 11 is followed by a driving profile 6 with a sharp-edged profiled longitudinal edge 12, with a group of three respective driving profiles 5 having proved themselves as especially advantageous for conventional applications. The sharp-edged longitudinal edges 12 of the driving profiles 6 support the entrainment of the longer straw stalks, whereas the aligning teeth 11 of the driving profiles 5 ensure a longitudinal guidance of the portions of the straw with long stalks. Furthermore, the sharp-edged profiled longitudinal edges 12 are additionally capable of tearing open husks and ears in order to detach grain that has not been threshed out.

Figure 2:
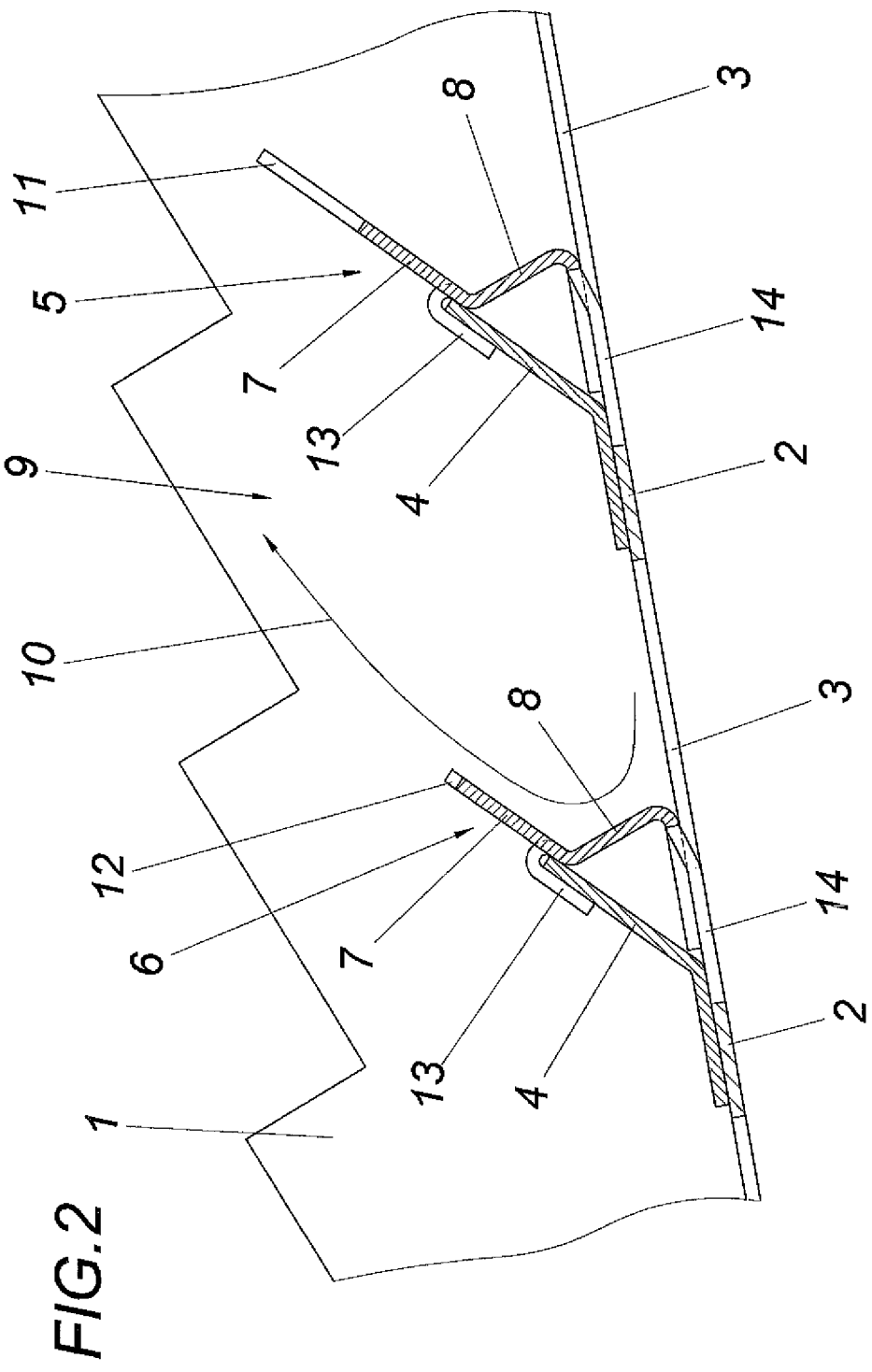
FIG. 2 shows a longitudinal sectional view on an enlarged scale of the straw walker in the region of a straw walker chamber between two driving profiles.
Figure 3:
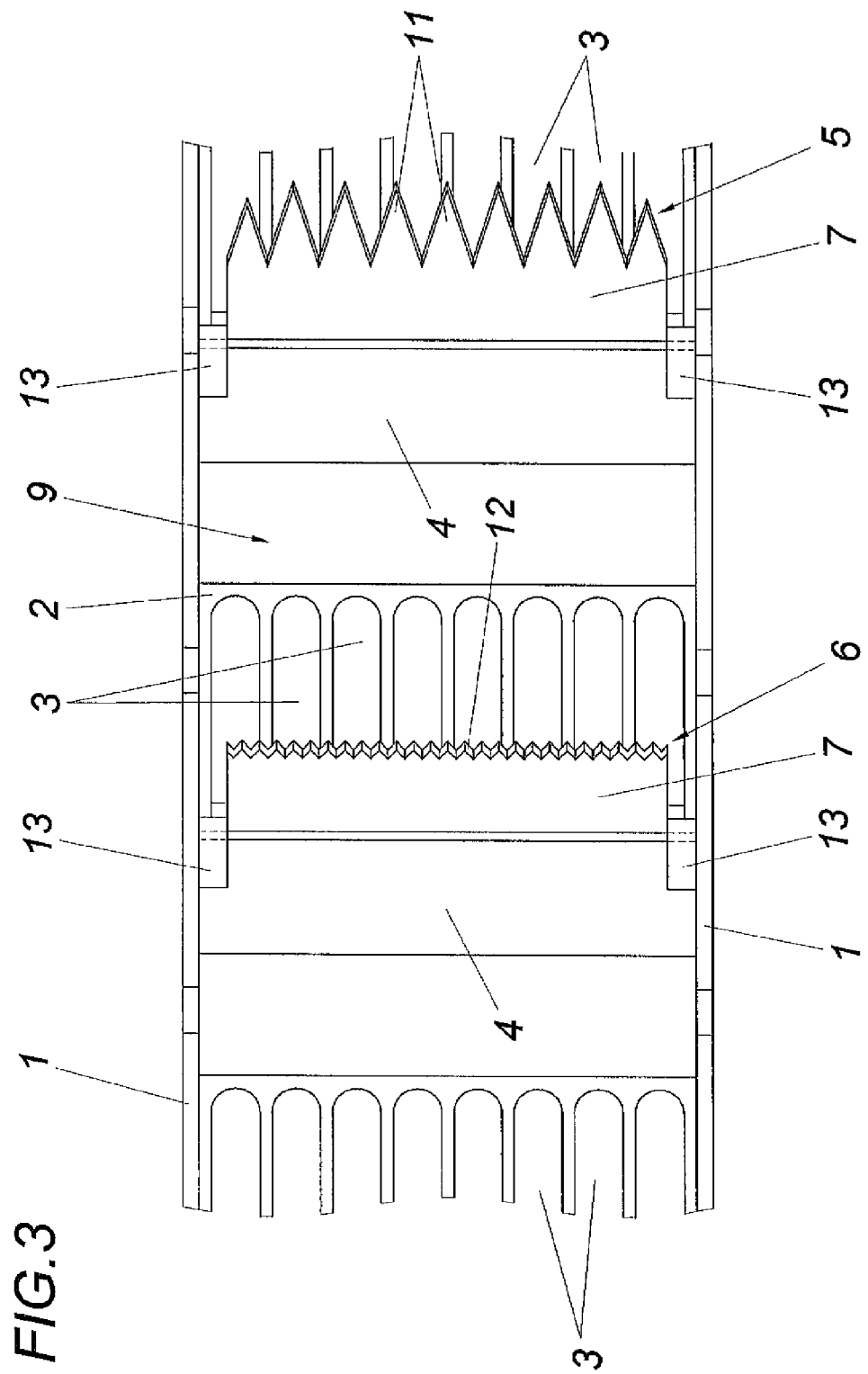
FIG. 3 shows the straw walker chamber according to FIG. 2 in a top view.

The connection of the driving profiles 5 and 6 with the conveying ribs 4 of the straw walker grates 2 can be provided in different ways. Especially simple constructional conditions are obtained however when the driving profiles 5, 6 form a plug-in receptacle 13 for the conveying ribs 4, because in this case the exchange of the driving profiles 5, 6 for adjustment to different threshing material is facilitated. The plug-in receptacles 13 can be formed in a simple way by bent end tongues of the profile limbs 7. The driving profiles 5 and 6 are additionally supported by fingers 14 which protrude in the manner of a comb against the conveying ribs 4 and engage in the elongated-hole-like through-openings 3 of the straw walker grate 2, as is shown in FIG. 2.

The invention claimed is:

1. A straw walker for a combine harvester, the straw walker comprising:
    a grate provided with through-openings for grain to be separated; and
    driving profiles arranged along the grate at a mutual distance from one another, each driving profile having a breast side at a front of the driving profile in a conveying direction, the driving profiles extending transversely to the conveying direction, and each driving profile comprising first and second profile limbs, wherein:
        at least a portion of the first profile limb upwardly extends from the second profile limb; and
        the second profile limb descends towards the grate in the conveying direction from the first profile limb to the grate on the breast side of the driving profile.

2. The straw walker according to claim 1, wherein the driving profiles comprise in an at least group-wise alternating manner a first driving profile wherein the first profile limb has a sharp-edged profiled longitudinal edge and a second driving profile wherein the first profile limb has a longitudinal edge provided with protruding aligning teeth.

3. The straw walker according to claim 2, wherein the first driving profile is arranged between two groups of three second driving profiles.

4. The straw walker according to claim 1, further comprising conveying ribs protruding upwardly from the grate,
    wherein the driving profiles are arranged as supplementary profiles to the conveying ribs.

5. The straw walker according to claim 4, wherein the driving profiles comprise plug-in receptacles for the conveying ribs.

6. The straw walker according to claim 5, wherein the second profile limbs of the driving profiles comprise fingers forming combs protruding against the conveying ribs and engaging into the through-openings of the grate.

* * * * *